(12) United States Patent
Nishio et al.

(10) Patent No.: US 8,700,282 B2
(45) Date of Patent: Apr. 15, 2014

(54) METHOD AND APPARATUS FOR VEHICLE SWAY DETECTION AND REDUCTION

(75) Inventors: Akitaka Nishio, Novi, MI (US); Kenji Asano, Toyota (JP); Hisashi Kajita, Gotemba (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 236 days.

(21) Appl. No.: 13/192,927

(22) Filed: Jul. 28, 2011

(65) Prior Publication Data

US 2013/0030665 A1   Jan. 31, 2013

(51) Int. Cl.
*G06F 19/00* (2011.01)
*G06F 7/70* (2006.01)

(52) U.S. Cl.
USPC ............. 701/70; 701/82; 701/83; 701/72; 303/140; 180/197

(58) Field of Classification Search
USPC ........... 701/70, 72, 82–83; 303/140; 180/197, 180/199; 702/141
See application file for complete search history.

(56) References Cited

U.S. PATENT DOCUMENTS

| | | | |
|---|---|---|---|
| 5,710,704 A * | 1/1998 | Graber | 701/82 |
| 6,523,911 B1 | 2/2003 | Rupp et al. | |
| 2006/0033308 A1 | 2/2006 | Waldbauer et al. | |
| 2006/0155457 A1 | 7/2006 | Waldbauer et al. | |
| 2006/0204347 A1 | 9/2006 | Waldbauer et al. | |
| 2009/0105906 A1 | 4/2009 | Hackney et al. | |
| 2013/0030665 A1 * | 1/2013 | Nishio et al. | 701/70 |

FOREIGN PATENT DOCUMENTS

| | | | |
|---|---|---|---|
| FR | 2895008 B1 * | 5/2010 | |
| JP | 2007321742 A * | 12/2007 | |
| WO | WO 2004022365 A2 * | 3/2004 | |

OTHER PUBLICATIONS

Input-Output Decoupling Control by Measurement Feedback in Four-Wheel-Active-Steering Vehicles; Marino, R. ; Cinili, F. Decision and Control, 2006 45th IEEE Conference on; Digital Object Identifier: 10.1109/CDC.2006.377274; Pub. Year: 2006 , pp. 1715-1720.*

Analysis of Vehicle Handling and Stability in Frequency Domain Based on System Identification Method; Wu Changshui et al.;Information Engineering (ICIE), 2010 WASE International Conference on; vol. 3; Digital Object Identifier: 10.1109/ICIE.2010.264; Pub Year: 2010 , pp. 365-368.*

(Continued)

*Primary Examiner* — Cuong H Nguyen
(74) *Attorney, Agent, or Firm* — Buchanan Ingersoll & Rooney

(57) ABSTRACT

A method and apparatus for controlling a vehicle involves determining if the vehicle is swaying and if the vehicle is swaying, reducing a torque of an engine of the vehicle and/or applying independent braking forces to each wheel of the vehicle. A vehicle for controlling vehicle sway includes an engine, a plurality of wheels, a braking system configured to apply independent braking forces to each wheel, and a controller configured to control the engine and the braking system. The controller is configured to determine a correlation coefficient in accordance with any phase shift occurring between a yaw acceleration signal and a lateral acceleration signal. The correlation coefficient is compared to a threshold value to determine whether the vehicle is swaying. If the vehicle is swaying, the controller causes a torque of the engine to be reduced and/or braking forces to be applied independently to each wheel.

14 Claims, 11 Drawing Sheets

(56) References Cited

OTHER PUBLICATIONS

Figure 1:
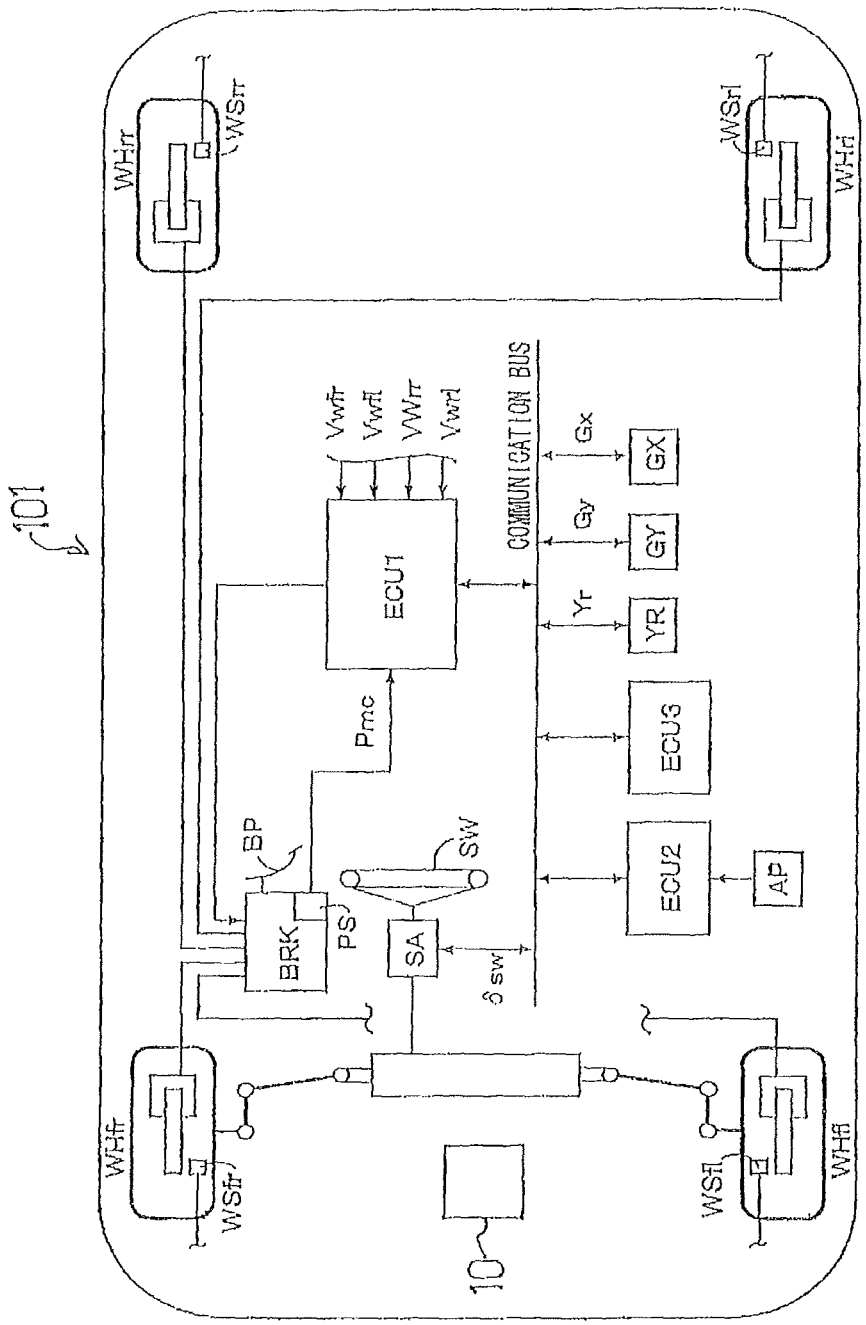

Modelling the hydrodynamic sway force exerted on the bare-hull of an axi-symmetric underwater vehicle in lateral acceleration manoeuvres; Azarsina, F. ; Williams, C.D. ; Issac, M.T.; Oceans 2008; Digital Object Identifier: 10.1109/OCEANS.2008.5151996 Publication Year: 2008 , pp. 1-9.*

PI Front Steering and PI Rear Steering Control with Tire Workload Analysis; Marino, R. ; Scalzi, S. ; Cinili, F.; Intelligent Vehicles Symposium, 2007 IEEE; Digital Object Identifier: 10.1109/IVS.2007.4290214; Publication Year: 2007 , pp. 799-804.*

New Regressors for the Direct Identification of Tire Deformation in Road Vehicles Via "In-Tire" Accelerometers; Savaresi, S.M. ; Tanelli, M. ; Langthaler, P. ; del Re, L.; Control Systems Technology, IEEE Transactions on; vol. 16 , Issue: 4 Digital Object Identifier: 10.1109/TCST.2007.912245; Publication Year: 2008 , pp. 769-780.*

A rollover mitigation control scheme based on rollover index; Jangyeol Yoon ; Kyongsu Yi; American Control Conference, 2006 Digital Object Identifier: 10.1109/ACC.2006.1657577; Publication Year: 2006.*

Head stabilization shows multisensory dependence on spatiotemporal characteristics of visual and inertial passive stimulation Wright, W.Geoffrey ; Agah, Mobin ; Darvish, K. ; Keshner, E.A.;Virtual Rehabilitation (ICVR), 2011 International Conference on Digital Object Identifier: 10.1109/ICVR.2011.5971869; Pub. Year: 2011 , pp. 1-4.*

Lateral balance control for robotic gait training; Koopman, B. ; Meuleman, J.H. ; van Asseldonk, E.H.F. ; van der Kooij, H. Rehabilitation Robotics (ICORR), 2013 IEEE International Conf. on; Digital Object Identifier: 10.1109/ICORR.2013.6650363 Publication Year: 2013 , pp. 1-6.*

Hac et al., "Stability and Control Considerations of Vehicle-Trailer Combination", SAE Technical Paper Series, 15 pgs, Apr. 2008.

* cited by examiner

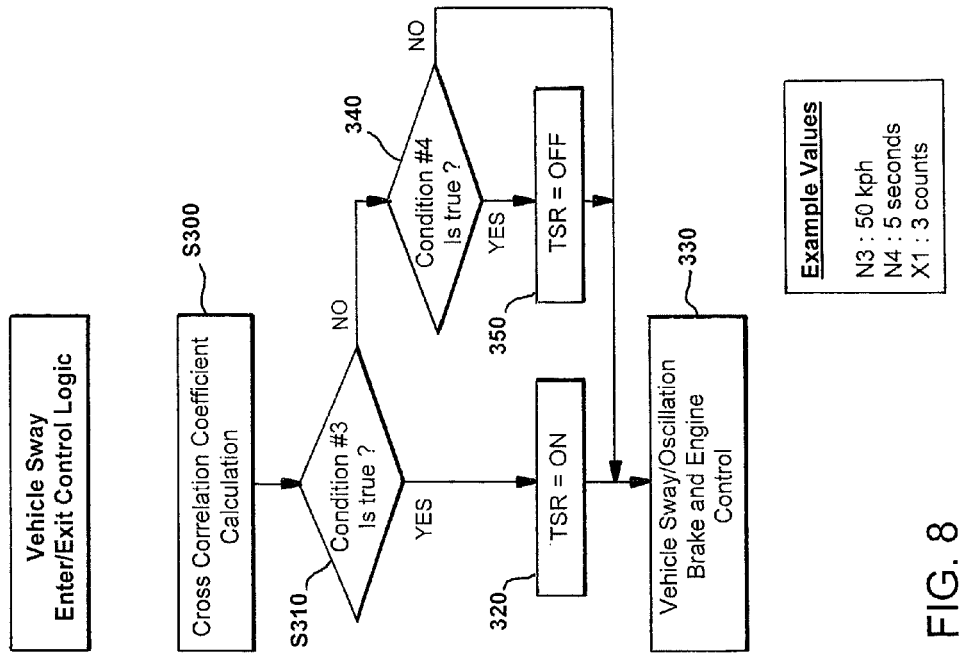
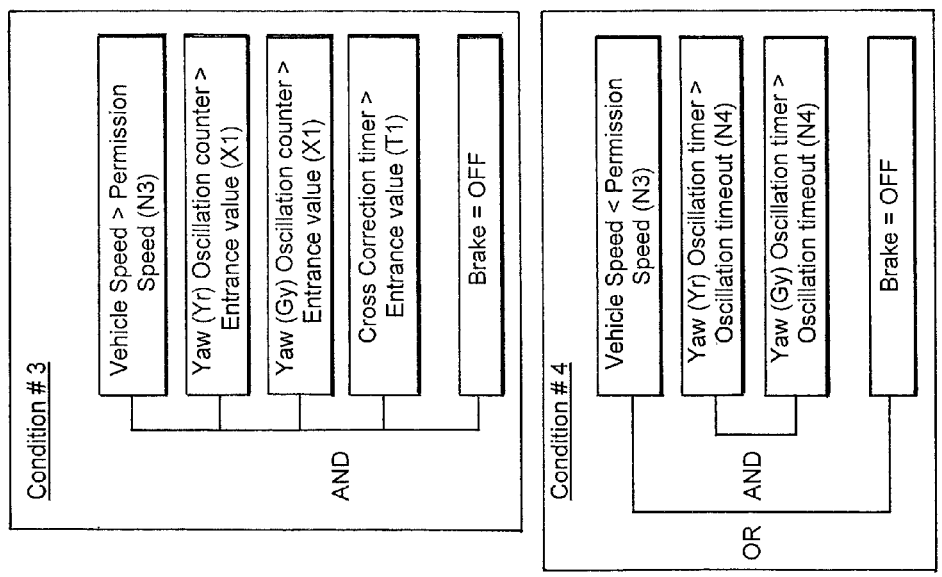
FIG. 8

METHOD AND APPARATUS FOR VEHICLE SWAY DETECTION AND REDUCTION

TECHNICAL FIELD

The present invention relates to a method and apparatus for detecting the sway of a vehicle. The present invention also relates to a method and apparatus for reducing the sway of a vehicle.

BACKGROUND DISCUSSION

Instances may arise when a vehicle begins to sway. Such sway can result in a variety of difficulties which should preferably be avoided. As an example, a trailer may be secured to the rear of a vehicle to be towed, for example, using a ball and receiver type hitch configuration, a pintle hook addition or the like. If the trailer becomes unstable, it oscillates laterally with a frequency and amplitude dependent on the road surface coefficient of friction and the mass of the trailer, including any payload carried by the trailer. A lateral oscillation force is then transferred to the towing vehicle through the tow hitch, wherein the vehicle undergoes sway.

U.S. patent application Ser. No. 11/875,142 (U.S. Application Publication No. 2009/0105906) discloses a method and apparatus for vehicle sway detection and reduction. If a sway requiring reduction is detected, the sway reduction is performed by reducing engine torque and applying independent braking forces to the respective vehicle wheels. The determination as to whether a vehicle is undergoing sway is complicated by the fact that the vehicle's motion could be the result of a combination of sway and slalom (i.e., oscillation due to steering movements of the driver, e.g., to avoid obstacles in the road.) As a result, false detections of sway or slalom may occur. Therefore, it would be desirable to determine if a vehicle is experiencing sway, even in cases where yaw acceleration and lateral acceleration attributable to driver steering movements (i.e., yaw acceleration and lateral acceleration attributable to vehicle slalom) are also present.

According to an embodiment disclosed here, a method for determining whether a vehicle is undergoing sway involves:

sensing yaw acceleration of a moving vehicle with a sensor and providing a yaw acceleration signal;

sensing lateral acceleration of the moving vehicle with a sensor and providing a lateral acceleration signal;

determining whether there is a phase shift of the yaw acceleration signal relative to the lateral acceleration signal;

calculating the magnitude of a phase shift determined in step C; and comparing the magnitude of the phase shift with a threshold value.

According to another aspect, a vehicle comprises an engine; a plurality of wheels; a braking system configured to apply independent braking forces to each wheel; and a controller operably connected to the engine and the braking system and configured to:

determine whether there is a phase shift of the yaw acceleration signal relative to the lateral acceleration signal;

calculate the magnitude of a phase shift which is determined;

compare the magnitude of the phase shift with a threshold value to determine whether the vehicle is undergoing sway; and if the vehicle is undergoing sway, perform at least one of: reducing a torque of the engine and applying a braking force independently to each wheel.

BRIEF DESCRIPTION OF THE DRAWING FIGURES

Various embodiments of the method and apparatus disclosed herein will be described in relation to the attached drawings briefly discussed below in which like elements and features are designated by like reference numerals.

FIG. 1 is a schematic illustration of one example of a vehicle outfitted with the sway detection and reduction apparatus or system described herein.

Figure 2:
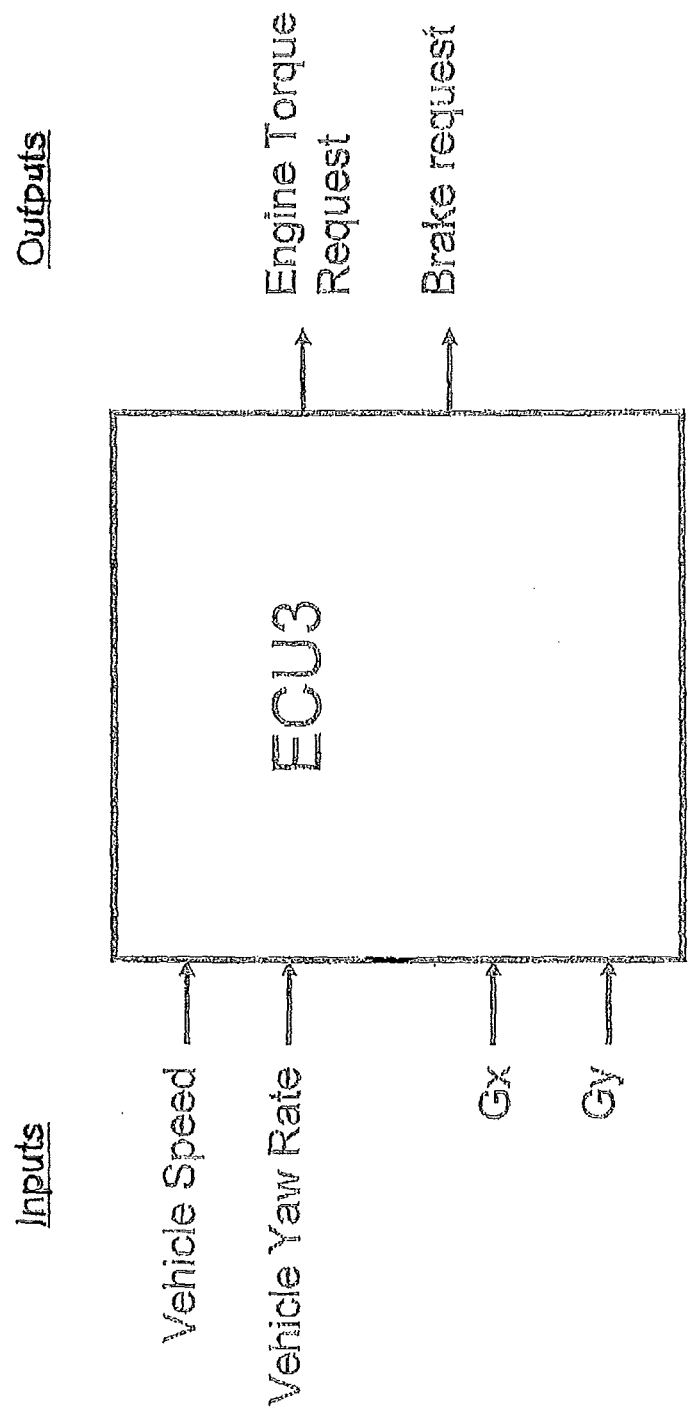

FIG. 2 schematically illustrates an embodiment of the system or apparatus for reducing the sway of a towing vehicle and a trailer as disclosed herein.

Figures 3A, 3B:
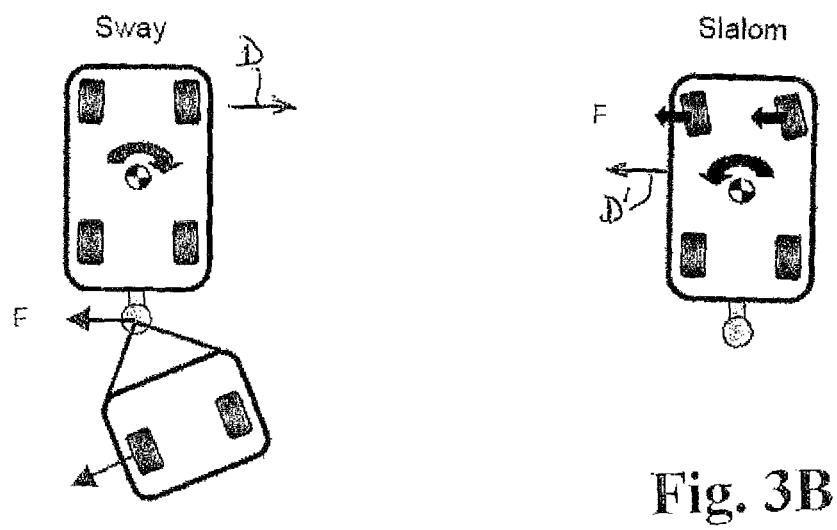

FIGS. 3A and 3B depict the directions of forces applied to a vehicle during sway and slalom, respectively.

Figure 4:
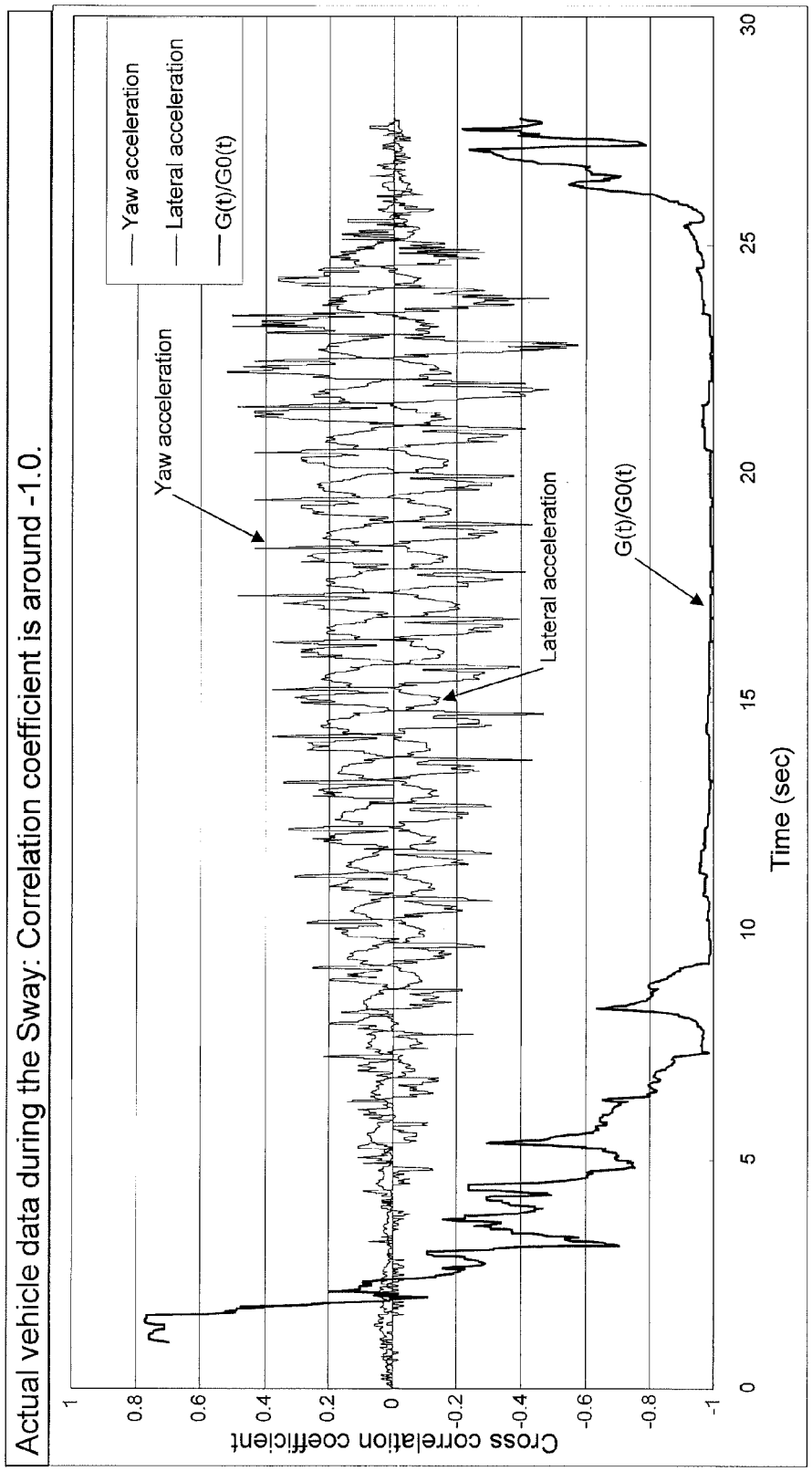

FIG. 4 plots correlation coefficient as a function of yaw acceleration signals and lateral acceleration signals in an actual sway condition of a vehicle.

Figure 5:
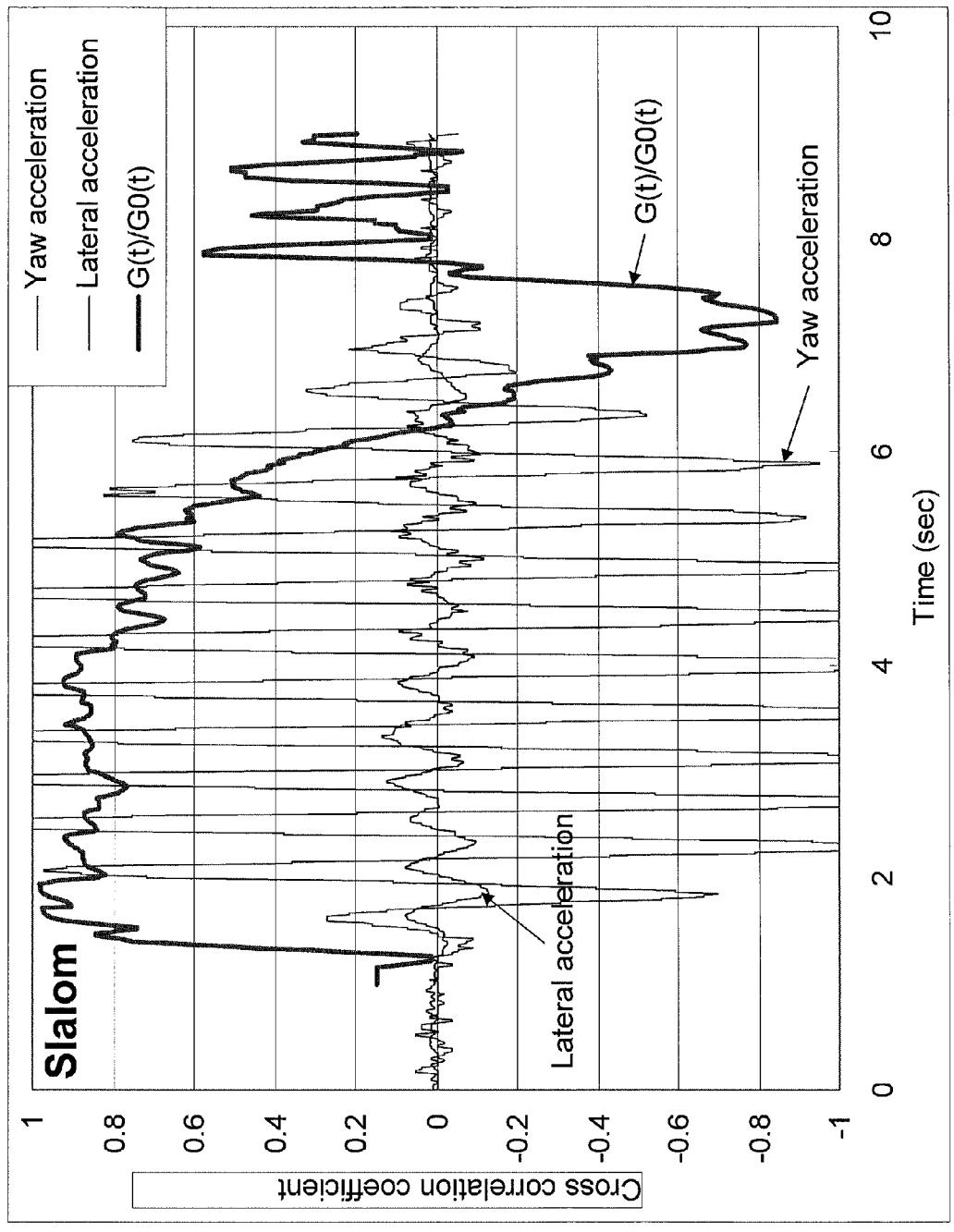

FIG. 5 plots correlation coefficient as a function of yaw acceleration signals and lateral acceleration signals in an actual slalom condition of a vehicle.

Figure 6:
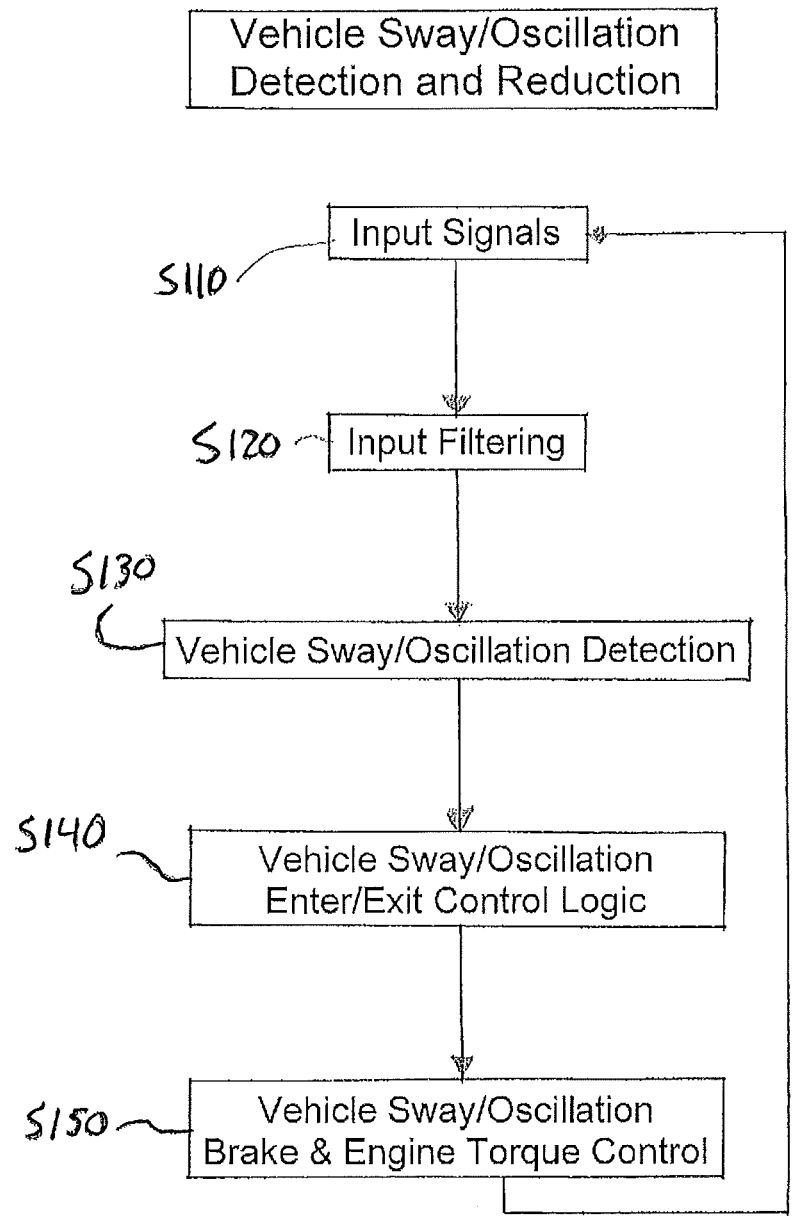

FIG. 6 schematically illustrates an example of a vehicle sway detection process.

Figure 7:
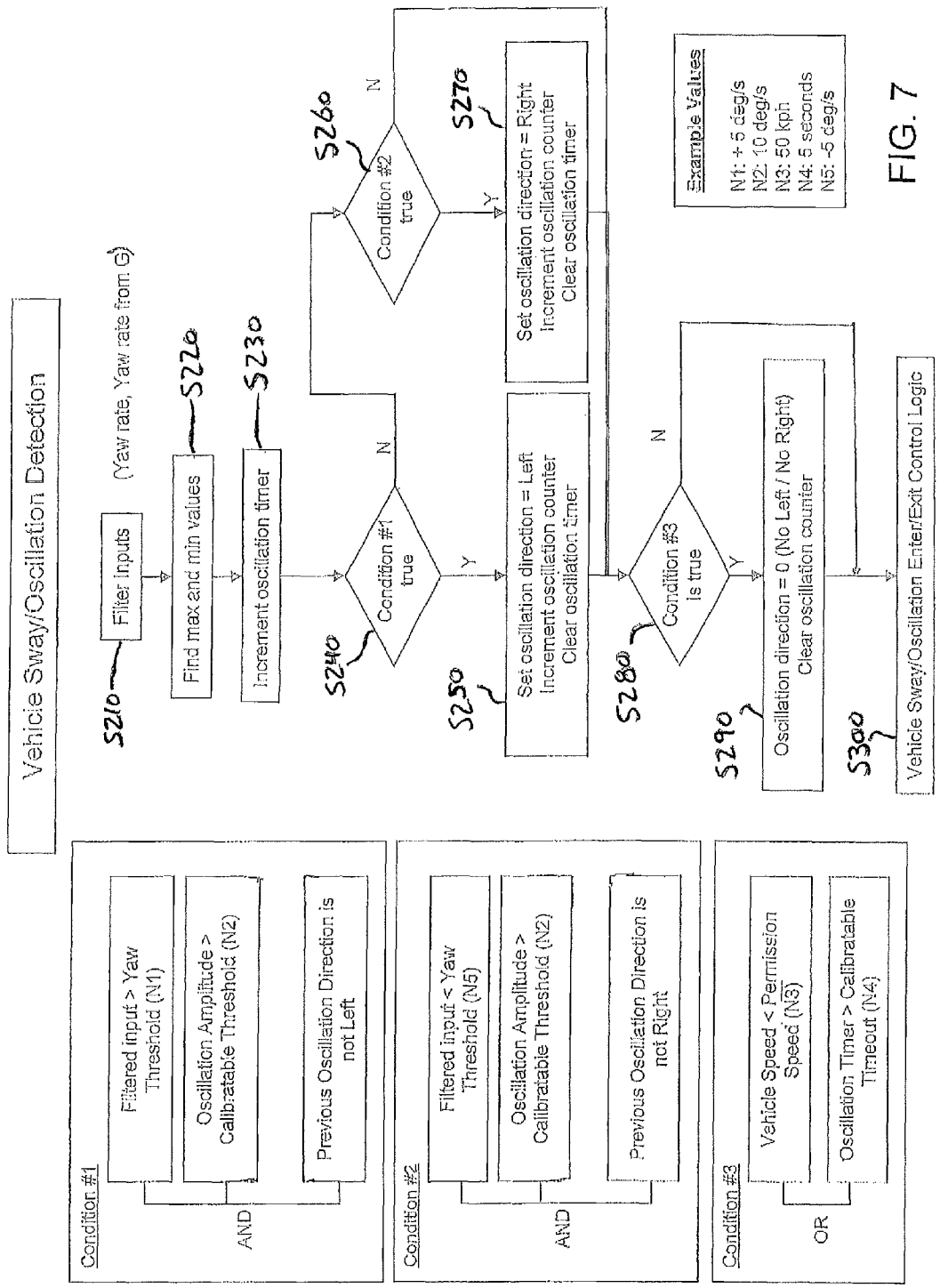

FIG. 7 schematically illustrates a vehicle sway/oscillation detection.

FIG. 8 schematically illustrates a vehicle sway enter/exit control logic.

Figure 9:
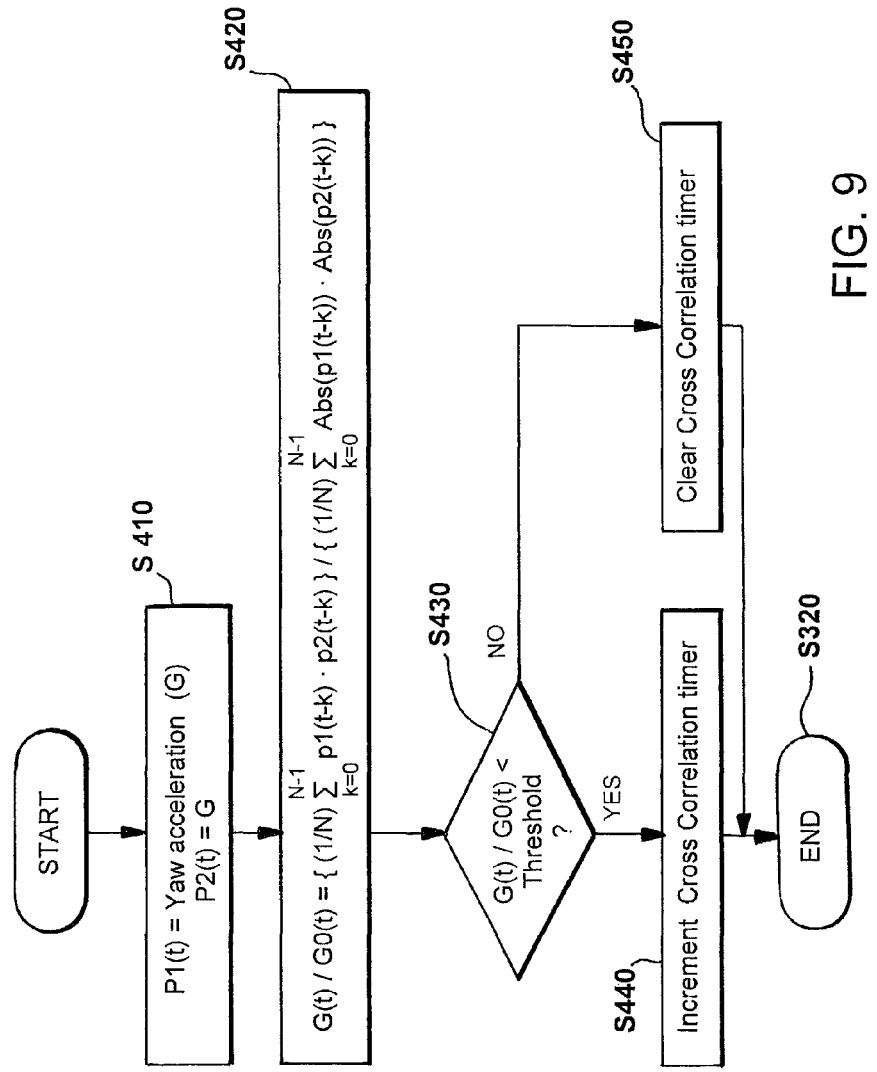

FIG. 9 depicts a cross correlation coefficient calculation of the vehicle sway detection and reduction process.

Figure 10:
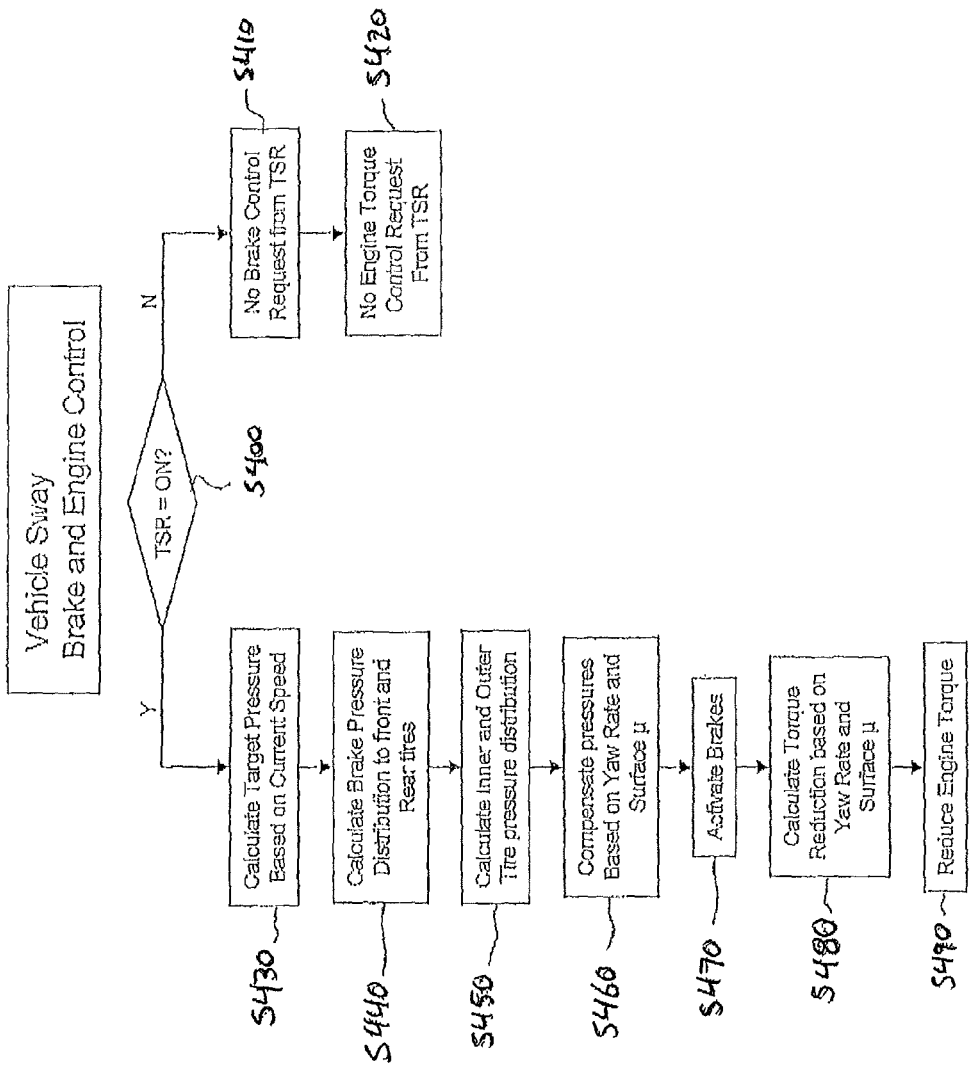

FIG. 10 schematically illustrates brake and engine control of the vehicle sway detection and reduction process.

Figure 11:
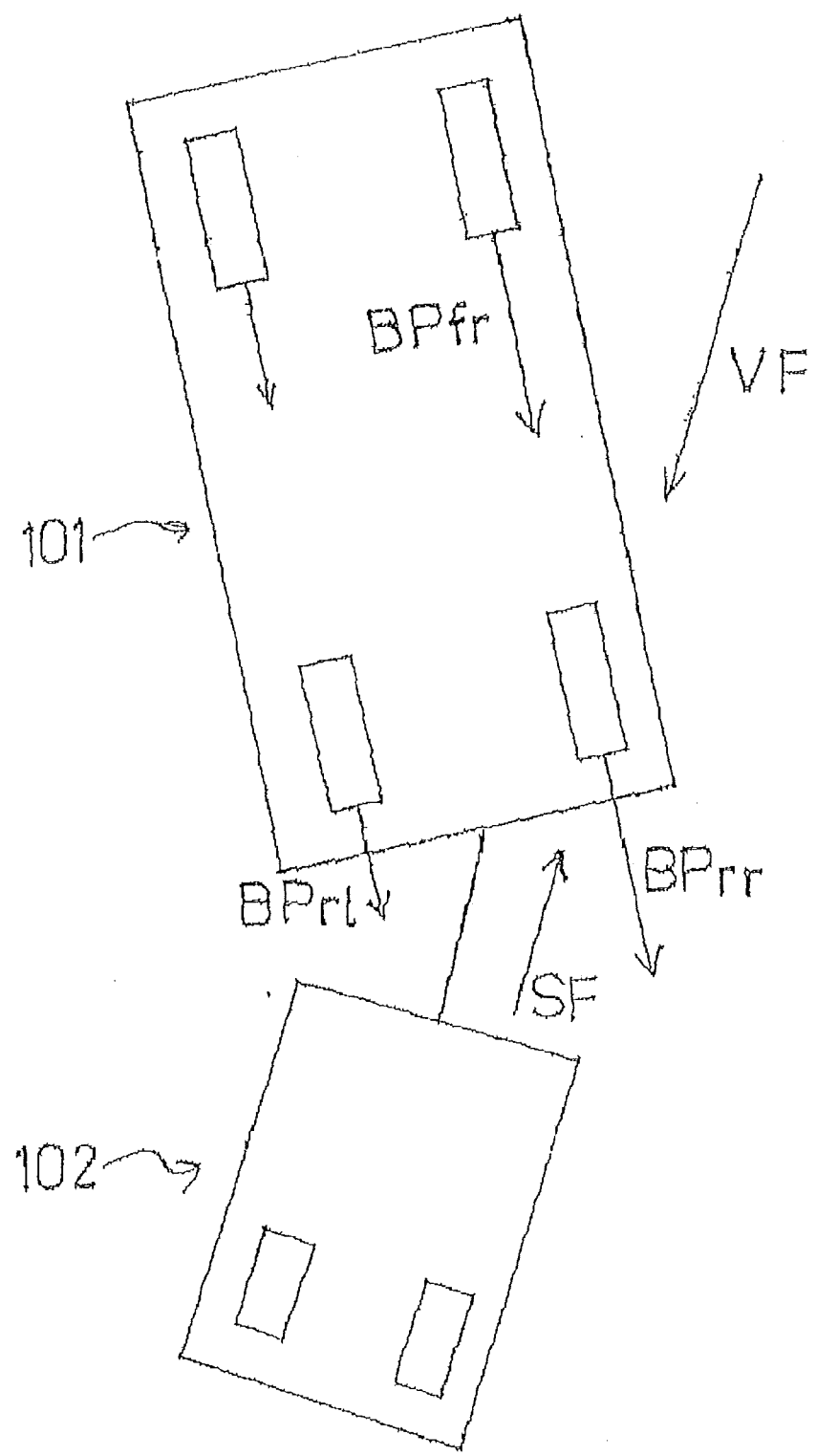

FIG. 11 schematically illustrates brake forces on a towing vehicle.

DETAILED DESCRIPTION

FIG. 1 schematically illustrates an overall structure of a vehicle 101 incorporating the vehicle sway detection and reduction mechanism disclosed here. The vehicle sway detection and reduction mechanism disclosed here has useful application in connection with a vehicle that is towing a trailer as the trailer itself may sway and thus induce sway in the vehicle towing the trailer. Thus, an embodiment of the vehicle sway detection and reduction mechanism is discussed below as used in a vehicle which is towing a trailer. However, the disclosed vehicle sway detection and reduction mechanism disclosed here is not limited in that regard as it is also applicable to the detection and reduction of vehicle sway resulting from sway-inducing influences other than a trailer. For example, instances of undesirable vehicle sway may occur when a vehicle is towing another vehicle, in the case of a vehicle such as a flat bed truck having a relatively long wheel base, or by virtue of other sway-inducing influences on a vehicle.

A brake system electronic control unit ECU1, engine system electronic control unit ECU2, and a vehicle sway detection/reduction control unit ECU3 are connected to one another through a communication bus, so that the information for each control unit can be fed from other control units. A steering angle sensor SA detects a steering angle δsw of a steering wheel SW, a longitudinal acceleration sensor GX detects the vehicle longitudinal acceleration Gx, a lateral acceleration sensor GY detects the vehicle lateral acceleration Gy, and a yaw rate sensor YR detects the yaw rate Yr of the vehicle. Wheel speed sensors WSfr, WSfl, WSrr, WSrl are provided for each wheel WHfr, WHfl, WHrr, WHrl, respectively. These wheel speed sensors are electrically connected to each electronic control unit ECU1-ECU3, via the communication bus, to supply the sensor signals. That is, the output from the wheel speed sensors is provided as input to the electronic control units ECU1-ECU3.

A brake actuator BRK is actuated either in response to brake pedal operation or by the brake system electronic control unit ECU1 independently of brake pedal operation. The brake actuator BRK generally controls the braking force applied at each wheel, either in response to depression of the brake pedal or independently of brake pedal operation in response to a signal from the brake system ECU1. A pressure sensor PS is provided in the brake actuator BRK for detecting an amount of operation of the brake pedal BP by the vehicle driver, to feed its detected pressure Pmc to the brake system ECU1. The braking force control for the vehicle sway reduction can be performed even in the case where the vehicle driver is not operating the brake pedal BP (i.e., independent of brake pedal actuation/operation).

The vehicle 101 includes an engine 10 which may transmit information to the engine system electronic control unit ECU2 and receive commands from the engine system electronic control unit ECU2. The engine may be any internal combustion engine, an electric motor, or a hybrid internal engine/electric motor system.

As shown in FIG. 1, each wheel speed sensor provides a signal Vwfr, Vwfl, Vwrr, Vwrl having pulses proportional to a rotational speed of each wheel, i.e., a wheel speed signal is fed to the brake system electronic control unit ECU1, wherein a vehicle speed in the longitudinal direction of the vehicle is calculated on the basis of wheel speed signals fed from the wheel speed sensors. The amount of operation of an accelerator pedal (not shown) is detected by an accelerator pedal sensor AP, and fed to the engine system electronic control unit ECU2 and the brake system electronic control unit ECU1 and the vehicle sway detection/reduction electronic control unit ECU3 through the communication bus as described before.

Referring to FIG. 2, the vehicle speed, the vehicle yaw rate, the steering angle, and the lateral and longitudinal accelerations are input into the vehicle sway detection/reduction electronic control unit ECU3. The vehicle sway detection/reduction electronic control unit ECU3 outputs an engine torque request to the engine system ECU2 and a brake request to the brake system ECU1. As discussed in detail below, detecting and reducing the sway of the vehicle may be performed using the vehicle speed, the vehicle yaw rate, the vehicle longitudinal acceleration, the vehicle lateral acceleration, and the steering wheel angle as inputs to the vehicle sway detection/reduction electronic control unit ECU3. It is to be recognized that it may not be necessary to use all such inputs if, for example, a vehicle is not outfitted with one or more of a longitudinal acceleration sensor GX, a lateral acceleration sensor GY, etc.

The method and apparatus disclosed here make use of the fact that during vehicle sway, the lateral force F produced by lateral acceleration acts on the vehicle V in a direction (i.e., to the left in FIG. 3A) which is opposite to the direction D (i.e., to the right) in which the moment M produced by yaw acceleration acts on the vehicle. In contrast, during slalom, the lateral force F' acts on the vehicle in a direction (i.e., to the left in FIG. 3B) which is the same as the direction D' in which the moment M' acts on the vehicle. Thus, during sway, those forces are out-of-phase and during slalom they are in phase, and it has been found that such in-phase/out-of-phase relationships can be used to determine whether the vehicle condition is a sway condition (as opposed to a slalom condition). That is, by monitoring the yaw acceleration and the lateral acceleration of the vehicle, determining whether a phase shift exists between the yaw acceleration and the lateral acceleration (without the need for input from a sensor indicating steering movement of the steering wheel), and determining the magnitude of that phase shift, the vehicle sway detection/reduction electronic control unit ECU3 can determine whether the vehicle is acting under sway (i.e., whether the vehicle is experiencing a sway condition as opposed to a slalom condition). In addition, if the vehicle sway detection/reduction electronic control unit ECU3 determines the vehicle is acting under a vehicle sway condition, the vehicle sway detection/reduction electronic control unit ECU3 determines if the vehicle sway is of such a nature as to warrant reduction under the control of the engine system ECU2 and the brake system ECU1 (i.e., the engine and/or the brake system can be controlled to reduce or eliminate the sway).

More particularly, a cross correlation equation is employed to calculate a cross correlation coefficient (also referred to as the "correlation coefficient") from measured values of yaw acceleration and lateral acceleration, and the calculated correlation coefficient is compared to a reference or threshold value. A calculated correlation coefficient less than the threshold value for a predetermined time period is an indication that a sway condition may exist which requires correction or reduction. A calculated correlation coefficient greater than the threshold indicates that there is no sway requiring correction or reduction. The cross correlation coefficient is thus used to express the probability of the occurrence of sway requiring correction or reduction. As an example, even in a situation where sway is not occurring, the correlation coefficient may be less than the threshold value if the vehicle is traveling on a bad road (e.g., rough road) for a relatively short period of time.

Ideally, in a case where the yaw acceleration signal is 180 degrees out-of-phase with the lateral acceleration signal, the correlation coefficient will be −1, a value which is less than the threshold value. On the other hand, in the case where the yaw acceleration and the lateral acceleration are due only to slalom, those signals will be in-phase, and the correlation coefficient will be +1, which is greater than the threshold value. It may also occur that those accelerations are due partly to sway and partly to slalom, in which case, the correlation coefficient will be somewhere between +1 and −1. A preferred threshold value against which to compare the calculated correlation coefficient to determine the existence of sway which may require correction or reduction is, for example, −0.3 to −0.5, more preferably −0.4.

It is necessary that the comparison between the correlation coefficient and the threshold value be observed for a certain period of time, because instantaneous fluctuations in the correlation coefficient may occur, which could produce false sway detections. In this regard, a preferred time period is 1 second to 3 seconds, preferably 2 seconds.

A general formula, expressed as a summation, which can be used to determine the correlation coefficient is the following formula (1):

$$\frac{\left\{\sum_{k=0}^{N-1}(p1(t-k)-p1ave)\cdot(p2(t-k)-p2ave)\right\}}{\left\{\begin{array}{l}\text{SQRT}\left(\sum_{k=0}^{N-1}(p1(t-k)-p1ave)^2\right)\cdot\\ \text{SQRT}\left(\sum_{k=0}^{N-1}(p2(t-k)-p2ave)^2\right)\end{array}\right\}} \quad 1$$

wherein:
N represents the number of samplings during a calculation period to calculate the correlation coefficient, for example 10 samplings.
p1 is the yaw acceleration.
p2 is the lateral acceleration.
p1ave is an average value of P1 over the calculation period (e.g., one second).

p2ave is an average value of P2 over the calculation period (e.g., one second).

SQRT is square root.

To reduce the calculation time, the following alternative formula (2) can be used to calculate the correlation coefficient. Here, a high pass filter value is used instead of averaging yaw acceleration and lateral acceleration (i.e., instead of p1ave and p2ave).

$$\frac{\left\{\sum_{k=0}^{N-1} p1(t-k) \cdot p2(t-k)\right\}}{\left\{\text{SQRT}\left(\sum_{k=0}^{N-1} p1(t-k)^2\right)\right\} \cdot \left\{\text{SQRT}\left(\sum_{k=0}^{N-1} p2(t-k)^2\right)\right\}}. \quad 2$$

To further reduce the calculation time, the following alternative formula (3) could be used to calculate the correlation coefficient. Here, the covariance of the yaw acceleration and the lateral acceleration is normalized by the convolution of the absolute value (Abs) of each signal.

$$\frac{\left\{(1/N)\sum_{k=0}^{N-1} p1(t-k) \cdot p2(t-k)\right\}}{\left\{(1/N)\sum_{k=0}^{N-1} \text{Abs}(p1(t-k)) \cdot \text{Abs}(p2(t-k))\right\}}. \quad 3$$

FIG. 4 illustrates actual vehicle data for yaw acceleration and lateral acceleration during a vehicle sway condition, and shows the calculated correlation coefficient. The correlation coefficient reaches and stays at or near a value of −1 for a sustained period. This is thus an illustration of the yaw acceleration and lateral acceleration vehicle data that would occur for a vehicle undergoing a vehicle sway condition.

FIG. 5 illustrates actual vehicle data for yaw acceleration and lateral acceleration during a vehicle slalom condition, and shows the calculated correlation coefficient. The correlation coefficient reaches and stays at a value at or near +1 for a sustained period. This is thus an illustration of the yaw acceleration and lateral acceleration vehicle data that would occur for a vehicle undergoing a vehicle slalom condition. As mentioned previously, it would be more common that the vehicle condition is actually a combination of vehicle sway and vehicle slalom. As discussed in more detail below, the apparatus and method here implement a vehicle sway detection and reduction process which identifies those conditions where vehicle sway is of such a character (e.g., duration and/or amplitude) that appropriate action should be taken to reduce or eliminate the vehicle sway.

The process for detecting and reducing sway is discussed below with reference initially to FIG. 7. The vehicle sway detection and reduction process begins at S110 where the vehicle speed, the vehicle yaw rate, the vehicle longitudinal acceleration and the vehicle lateral acceleration are entered as inputs into the ECU3. The process then proceeds to S120 where the inputs are filtered. This is followed by S130 where vehicle sway detection and reduction is performed. The vehicle sway detection, and subsequent reduction when necessary, is described in more detail below.

The process in FIG. 6 then proceeds to S140 where, in this described embodiment involving a vehicle towing a trailer, a vehicle sway/oscillation enter/exit control logic process is performed. The enter/exit control logic process is described below in more detail with reference to FIG. 8. Following the operation performed in S140, the process proceeds to S150 where the brake and engine torque control is performed, whereupon the process returns to S110 for the inputting of signals.

FIG. 7 illustrates the vehicle sway or oscillation detection of S130 in FIG. 6. As shown in FIG. 7, the process routine begins at S210 with the filtered inputs. The filtered inputs here include the yaw rate Yr from the yaw rate sensor YR and the vehicle lateral acceleration or yaw rate Gy from the lateral acceleration sensor GY. In practice, the illustrated routine is carried out for each of the filtered inputs. At S220, the filtered input is checked to determine the maximum and minimum peak values. As discussed in more detail below, the maximum and minimum values are used to determine an oscillation amplitude which is then compared to a threshold (N2). The minimum and maximum peak values for the cycle may be stored in a memory of the ECU 3. The process then proceeds to S230 where an oscillation timer is incremented. The system preferably includes an oscillation timer for each of the three filtered inputs, and at S230, the oscillation timer for the respective filtered input is incremented. In the disclosed embodiment, the oscillation timer starts when the vehicle is turned on. The oscillation timer clears when, as discussed below, Condition #1 or Condition #2 is met.

Next, at S240, it is determined whether Condition #1 is true. That is, as shown in the upper left portion of FIG. 4, Condition #1 is determined to be true (S240: Yes) when all three of the noted conditions are satisfied. The three noted conditions are: 1) the filtered input is less than a yaw threshold; 2) the oscillation amplitude is greater than a calibratable threshold; and 3) the previous (immediately preceding) oscillation direction of the trailer is not to the left.

The yaw threshold against which the respective filtered inputs are measured can vary and is preferably set at a value which indicates that the oscillation or yaw is at a level which warrants further consideration from the standpoint of determining whether sway reduction through active control may be required. In the disclosed embodiment, the yaw threshold N1 for each of the filtered inputs is set at +5 degrees (oscillation or sway to the left being represented in the disclosed embodiment by a positive angle and oscillation or sway to the right being represented by a negative angle), as an example.

The oscillation amplitude which is compared to the calibratable threshold is determined by considering the oscillation amplitude of the current oscillation relative to the previous oscillation. For example, the first time an oscillation is found to exist, this oscillation is compared to zero so that if the vehicle is swaying to the left by 8 degrees, the oscillation amplitude is 8 degrees. If this is followed by an oscillation to the right of 8 degrees, the oscillation amplitude will be determined to be 16 degrees (the current oscillation of −8 degrees relative to the prior oscillation of +8 degrees). The oscillation amplitude is compared to a calibratable threshold which can be set at an appropriate level depending upon, for example, the desires and/or requirements of a particular vehicle or manufacturer. In the disclosed embodiment, a calibratable threshold N2 of 10 deg/s is used for each of the filtered inputs, as an example.

The determination of the oscillation direction of the vehicle, for purposes of ascertaining whether or not the previous oscillation is to the left, may be determined based on the outputs of the lateral acceleration sensor GY and the yaw rate sensor YR.

If Condition #1 is determined to be true at S240 (i.e., all three of the noted conditions are satisfied), the routine proceeds to S250 where the oscillation direction is set as left, an oscillation counter is incremented as appropriate, and the oscillation timer (which times the duration of oscillations) are cleared. The system preferably includes an oscillation counter associated with each of the filtered inputs (i.e., a yaw (Yr) oscillation counter which counts the oscillations associated with the filtered yaw rate from the yaw rate sensor YR, and a lateral acceleration oscillation counter which counts the oscillations associated with the filtered yaw rate or lateral acceleration from the lateral acceleration sensor GY), with the appropriate oscillation counter being incremented depending on the filtered input being analyzed. Following S250, the routine continues to S280.

On the other hand, if it is determined at S240 that Condition #1 is not true (i.e., at least one of the three noted conditions for Condition #1 is not satisfied), the process proceeds to S260 where it is determined if Condition #2 is satisfied. That is, as shown in the middle left portion of FIG. 4, Condition #2 is determined to be true (S260: Yes) when all three of the noted conditions are satisfied. The three noted conditions are: 1) the filtered input is less than the yaw threshold (i.e., the filtered input exceeds the yaw threshold); 2) the oscillation amplitude is greater than a calibratable threshold; and 3) the previous (immediately preceding) oscillation direction of the trailer is not to the right.

Once again, the yaw threshold against which the filtered input is measured in Condition #2 can vary and is preferably set at a value which indicates that the oscillation or yaw is at a level which warrants further consideration from the standpoint of determining whether sway or oscillation reduction through active control may be required. In the disclosed embodiment, the yaw threshold N5 for Condition #2 is set at −5 degrees, as an example.

Also, consistent with the above description of Condition #1, the oscillation amplitude which is compared to the calibratable threshold is determined by considering the oscillation amplitude of the current oscillation of the filtered input being analyzed relative to the previous oscillation. The oscillation amplitude is compared to a calibratable threshold which can be set at an appropriate level. In the disclosed embodiment, a calibratable threshold N2 of 10 deg/s is used for each of the filtered inputs, as an example.

As also discussed above with respect to Condition #1, the determination of the oscillation direction of the vehicle, for purposes of ascertaining whether or not the previous oscillation is to the right, may be determined based on the outputs of the lateral acceleration sensor GY and the yaw rate sensor YR.

If Condition #2 is determined to be true at S260 (i.e., all three of the noted conditions are satisfied), the routine proceeds to S270 where the oscillation direction is set as right, the oscillation counter is incremented as appropriate, and the oscillation timer is cleared. The routine then continues to S280.

If it is determined that Condition #2 is not true at S260 (i.e., at least one of the three noted conditions for Condition #2 is not satisfied), the process proceeds to S280.

At S280, it is determined whether Condition #3 is true. That is, as noted in the lower left hand portion of FIG. 4, Condition #3 is determined to be true when at least one of the two noted conditions is satisfied. The two noted conditions are: 1) the vehicle speed is less than a permission or permissible vehicle speed; and 2) the oscillation timer is greater than the calibratable time. When the vehicle is traveling at a relatively slow speed, oscillations which may be present are not of significant concern. The permission or permissible vehicle speed can be set at a desired level depending on, for example, the desired threshold or sensitivity at which sway is to be addressed. In the disclosed embodiment, this permission or permissible vehicle speed N3 is set at 50 km/hr, as an example.

If the oscillation timer for the filtered input being considered is determined at S280 to be greater than a calibratable timeout N4 which, in the disclosed embodiment, is set at 5 seconds as an example, it is determined that Condition #1 and Condition #2 have not been satisfied for the calibratable timeout period.

If it is determined that Condition #3 is true (i.e., at least one of the two noted conditions for Condition #3 is satisfied), the process proceeds to S290 where the oscillation direction is determined to be neither left nor right, and the oscillation counter is cleared. From S290, the routine proceeds to the sway/oscillation enter/exit control logic which is shown in more detail in FIG. 8. On the other hand, if at least one of the two noted conditions for Condition #3 is not satisfied (i.e., the vehicle speed is greater than the permission speed N3 and the oscillation timer is less than the calibratable timeout N4) at S280, the process proceeds from S280 to S300.

Thus, Condition #1 and Condition #2 in S240 and S260 respectively identify situations in which yaw or oscillation have been detected and where the oscillation or yaw is at a level which warrants further consideration from the standpoint of determining whether sway or oscillation reduction through active control may be required. Condition #1 at S240 determines the existence of such yaw or oscillation to the left, while Condition #2 at S260 determines the existence of such yaw or oscillation to the right. If Condition #1 or Condition #2 is satisfied, it is then determined in S280 whether the vehicle speed is less than the permission speed. If so, it is considered that the oscillation or yaw is not of significant concern due to the low vehicle speed, and the oscillation direction is set at zero. If neither Condition #1 nor Condition #2 is satisfied, and it is determined at S280 that the vehicle speed is less than the permission speed N3 or the oscillation timer is greater than the calibratable timeout N4, the oscillation direction is also set to zero.

Referring to FIG. 8, the vehicle sway/oscillation enter/exit control logic begins at S300 with a calculation of the cross correlation coefficient, which was discussed earlier and is described here in connection with FIG. 9. As shown in FIG. 9, signals from the yaw acceleration detector and the lateral acceleration detector are received in step S410. Then one of the afore-described correlation coefficient formulae (e.g., no. 3) is utilized in step S420 to calculate the correlation coefficient, which is then compared to the threshold value in step S430 of FIG. 9. If the correlation coefficient is less than the threshold value (e.g., a correlation coefficient of −1 would be considered less than the preferred threshold value of −0.4), the operation proceeds to step S440 where the cross correlation coefficient timer is incremented so that it can be determined whether the cross correlation coefficient has been less than the threshold value for a time period equal to or exceeding a predetermined time period T. If the cross correlation coefficient is found to be greater than the threshold value in step S430, the operation proceeds to step S450 where the cross correlation coefficient timer is cleared. The cross correlation coefficient calculation is then ended.

Referring back to FIG. 8, Step S310 involves a determination whether Condition #3 is true. That is, as shown in the upper left portion of FIG. 7, Condition #3 is determined to be true (S310: Yes) when all five of the noted conditions are satisfied. The five noted conditions are: 1) the vehicle speed is greater than the permission (permissible) speed N3; 2) the number of counts determined by the yaw rate (Yr) oscillation counter is greater than an entrance value (discussed below);

3) the number of counts determined by the lateral acceleration (Gy) oscillation counter is greater than an entrance value (discussed below); 4) the cross correlation timer exceeds an entrance value (T1); and 5) the brake is off, meaning that the driver is not pressing on the brake pedal.

In the disclosed embodiment, the entrance (reference) values X1 against which the yaw rate (Yr) oscillation counts and the lateral acceleration (Gy) oscillation counts are compared are the same and are indicated as three counts, as an example. In this regard, it is to be understood that in this disclosed embodiment, one count refers to one oscillation. Thus, three counts refers to three oscillations, meaning an oscillation in one direction (e.g., to the left), an oscillation in the opposite direction (e.g., to the right) and an oscillation back to the one direction (e.g., to the left). Of course, other entrance values can be used, and each of the oscillation counters (i.e., the yaw (Yr) oscillation counter and the lateral acceleration (Gy) oscillation counter) can be compared against different entrance values.

In the disclosed embodiment, the entrance value T1 against which the cross-correlation timer is measured can be 2 seconds, as an example, although other values can be used if desired. Also, the determination of whether the brake is off (i.e., whether the driver is pressing the brake pedal) can be determined in a known manner, for example through a sensor which detects operation of the brake pedal.

If it is determined in S310 that Condition #3 is true (i.e., that all five of the noted conditions are satisfied), it is determined that sway is occurring that requires reduction. The sway reduction reduces the sway in the vehicle, thus also reducing sway in the trailer. Thus, the process proceeds to S320 at which sway reduction (trailer sway reduction, TSR, in this embodiment), for example a sway reduction switch, is turned ON, whereupon the process proceeds to S330 at which the sway brake and engine control is performed as described in more detail with reference to FIG. 10.

At S310, if it is determined that Condition #3 is not true (i.e., if at least one of the five noted conditions is not satisfied), the routine proceeds to S340 where it is determined if Condition #4 is true or is satisfied. That is, as shown in the lower left portion of FIG. 4, Condition #4 is determined to be true (S340: Yes) when: 1) the vehicle speed is less than the permission speed; or 2) the yaw rate (Yr) oscillation timer is greater than an oscillation timeout (i.e., each of the oscillations whose amplitude is less than the amplitude threshold lasts for at least a certain number of seconds) and the lateral acceleration (Gy) oscillation timer is greater than an oscillation timeout (i.e., each of the oscillations whose amplitude is less than the amplitude threshold lasts for at least a certain number of seconds); or 3) the brake is off, meaning that the driver is pressing on the brake pedal. In Condition 4, one of the three alternative conditions (the second listed alternative condition) actually involves satisfaction of two conditions, namely the yaw rate (Yr) oscillation timer is greater than the oscillation timeout and the lateral acceleration (Gy) oscillation timer is greater than the oscillation timeout.

In this disclosed embodiment, the oscillation timeout (N4) against which the yaw rate (Yr) oscillation timer and the lateral acceleration (Gy) oscillation timer are compared is the same and is, by way of example, 5 seconds. Of course, other oscillation timeout values can be used, and the yaw rate (Yr) oscillation timer and the lateral acceleration (Gy) oscillation timer can be compared against different respective oscillation timeout values rather than the same timeout value. Thus, if the oscillation movement is very slow, no reduction is needed.

If it is determined that Condition #4 is true (i.e., if at least one of the three noted conditions is satisfied), the flow proceeds to S350 at which the sway reduction (TSR) is turned OFF. Thereafter, the process proceeds to S330. Following a determination in S340 that Condition #4 is not true (i.e., none of the three noted conditions for Condition #4 is satisfied), the process proceeds to S330.

The sway brake and engine control noted at S330 in FIG. 7 is carried out according to the process or routine shown in FIG. 10. The process begins at S400 where it is determined whether or not the trailer sway reduction (TSR) is ON. If the trailer sway reduction is not on, no brake control request and no engine torque control request are sent as noted at S410 and S420.

On the other hand, if the trailer sway reduction (TSR) is ON, the routine proceeds to S430 at which is calculated a target wheel pressure based on the vehicle speed. For example, if the vehicle is traveling at 100 km/hr, a relatively larger target wheel pressure could be calculated as compared to if the vehicle is traveling at 60 km/hr. Next, at S440, a suitable brake pressure distribution between the front and left wheels is calculated, followed by calculation of the pressure distribution between the inner and outer wheels at S450. The brake pressure distribution to the front and rear wheels and the brake pressure distribution to the inner and outer wheels can be calculated in a manner similar to that used in automatic stability control systems for purposes of counteracting yaw.

Next, at S460, the brake pressure is compensated based on the yaw rate and the road surface coefficient of friction (p). Once again, this can be done in a manner similar to that used in automatic stability control systems for counteracting yaw. Thereafter, the respective wheel brakes are activated in S470 according to the determined pressures to reduce the vehicle speed and sway, including trailer sway. That is, a request is sent from the vehicle sway detection/reduction ECU3 to the brake system ECU1 to apply the brakes to the individual wheels of the vehicle 101 according to the calculated brake pressures. Then, at S480, an engine torque reduction is calculated based on the yaw rate and the road surface coefficient of friction (p). The engine torque reduction can be calculated in a manner similar to that used in automatic stability control systems for counteracting yaw. Following S480, the calculated engine torque reduction is carried out at S490. That is, the vehicle sway detection/reduction ECU3 sends a request to the engine system ECU2 to perform a torque reduction according to the calculated engine torque reduction.

As mentioned, the sway detection and reduction processes described above have useful application where a towing vehicle gets into a lateral periodic oscillation caused by an attached swaying trailer. In order to detect if the vehicle is in a lateral oscillatory state, signals from the yaw rate sensor and the lateral acceleration sensor are relied upon.

The trailer sway reduction process according to the embodiment disclosed here reduces the engine torque and applies brake pressure to stop and/or lessen the severity of the oscillations of the towing vehicle due to the swaying trailer. When the lateral oscillations of the towing vehicle are detected and required to be addressed, the vehicle sway detection/reduction ECU3 sends a message to the engine system ECU2 to reduce the engine torque and the vehicle sway detection/reduction ECU3 also sends a command to the brake system ECU1 to independently control the brake pressure applied to each of the four wheels of the towing vehicle.

It will be appreciated that false detection of vehicle sway (e.g., associated with trailer sway) is avoided by monitoring the correlation coefficient in the earlier described manner. Using the correlation coefficient, the vehicle sway detection/reduction ECU3 distinguishes between vehicle slalom, which does not require appropriate control (e.g., sway brake and engine control) and vehicle sway which, depending on, for example, the severity of the sway and the time duration, may require appropriate control (e.g., sway brake and engine control). In this regard, the vehicle sway detection/reduction ECU3 constitutes an example of means for distinguishing between vehicle slalom and vehicle sway without requiring input from a sensor providing input about the steering wheel angle (rotational angle), and when it is determined that vehicle sway exceeding a predetermined level for more that a predetermined period of time (T1) exists, communicates with the engine system ECU2 and/or the brake system ECU 1 to reduce the vehicle sway. The apparatus and method here thus determine the vehicle sway condition without using the steering angle.

When sway detection occurs, brake pressures BPfr, BPfl, BPrr, BPrl are preferably induced on all four wheels of the vehicle 101 and the brake pressures are determined by vehicle speed, surface friction, and vehicle yaw. The brake pressure is stronger on the outside wheels of the vehicle in the direction of the vehicle's yaw moment. For example, the brake pressure BPfr is the greatest at the outside front wheel WHfr, as shown in FIG. 11, so that the generated vehicle force VF from brake pressure counteracts the sway force/moment SF generated by the trailer 102 to reduce the sway of the vehicle 101 and the trailer 102. The vehicle force VF generated from the brake pressure also slows the vehicle 101, which reduces sway. Thus, brake input from the vehicle counteracts the sway moment generated by the trailer and reduces vehicle and trailer sway. The brake pressure also slows the vehicle which reduces sway.

The sway reduction control process preferably exits or ends when one or more of the following conditions occurs: 1) vehicle oscillation returns to normal; 2) vehicle speed falls below a permission or permissible speed (e.g., 50 km/h (kph); 3) the driver counter-steers more than an entrance value (e.g., 50 degrees) a plurality of times; and 4) the driver depresses the brake pedal with sufficient force.

Another aspect of the disclosure here involves a non-transitory tangible computer readable medium (e.g., the controller constituted by one or more of the brake system ECU1, the engine system ECU2 and the vehicle sway detection/reduction ECU3) which stores a control program for determining whether vehicle sway exists and effecting a control to reduce the vehicle sway in a vehicle which includes an engine 10, a plurality of wheels WHfr, WHfl, WHrr, WHrl, sensors GY, YR which sense yaw acceleration and lateral acceleration of the vehicle while moving to provide a yaw acceleration signal and a lateral acceleration signal; the control program enabling a computer to execute a control comprising: determine whether there is a phase shift of the yaw acceleration signal relative to the lateral acceleration signal; calculating, when a phase shift is determined to exist, a magnitude of the phase shift; determine if the vehicle is undergoing sway by comparing the magnitude of the phase shift with a threshold value; and reducing a torque of the engine and/or applying a braking force independently to one or more of the wheels by the brake system when it is determined that the vehicle is undergoing sway.

The processes described above may be initiated automatically upon starting of the vehicle, or they may be initiated manually by the application of a switch, such as a switch operated by the driver or a switch that is activated when a trailer is operatively connected to the vehicle for towing.

It should be appreciated that although the embodiments described above include a vehicle having four wheels, the method and apparatus are also applicable to vehicles having any number of wheels. It should also be appreciated that although the method and apparatus has been described with reference to a trailer, the method and apparatus are also applicable to situations in which a first vehicle tows a second vehicle, and in other situations in which detection of vehicle sway, and subsequent control and reduction of sway if necessary, are desirable.

Although the invention has been described above with reference to the disclosed embodiments, it should be appreciated that various modifications may be apparent to those of ordinary skill in the art without departing from the spirit and scope of the invention as defined in the claims attached hereto.

What is claimed is:

1. A method of determining whether a vehicle is undergoing sway, comprising:
  A. sensing yaw acceleration of a moving vehicle by way of a sensor and providing a yaw acceleration output;
  B. sensing lateral acceleration of the moving vehicle with a sensor and providing a lateral acceleration signal;
  C. determining whether there is a phase shift of the yaw acceleration signal relative to the lateral acceleration signal;
  D. calculating the magnitude of the phase shift determined in step C; and
  E. comparing the magnitude of the phase shift with a threshold value to determine whether the vehicle is undergoing sway.

2. The method according to claim 1 wherein the calculation of step D comprises calculating a correlation coefficient indicating the magnitude of the phase shift by the formula:

$$\frac{\left\{\sum_{k=0}^{N-1}(p1(t-k)-p1ave)\cdot(p2(t-k)-p2ave)\right\}}{\left\{\mathrm{SQRT}\left(\sum_{k=0}^{N-1}(p1(t-k)-p1ave)^2\right)\cdot\mathrm{SQRT}\left(\sum_{k=0}^{N-1}(p2(t-k)-p2ave)^2\right)\right\}}$$

wherein:
  N=number of samplings during a calculation period to calculate the correlation coefficient
  k=index of summation
  p1=yaw acceleration at time t
  p1 ave=average YAW ACCELERATION value of P1
  p2=lateral acceleration at time t
  p2 ave=average lateral acceleration
  SQRT=square root.

3. The method according to claim 2, wherein step E further comprises determining whether the correlation coefficient is less than the threshold value for at least a predetermined time period.

4. The method according to claim 1 wherein the calculation of step D comprises calculating a correlation coefficient indicating the magnitude of the phase shift by the formula:

$$\frac{\left\{\sum_{k=0}^{N-1}p1(t-k)\cdot p2(t-k)\right\}}{\left\{\mathrm{SQRT}\left(\sum_{k=0}^{N-1}p1(t-k)^2\right)\cdot\left\{\mathrm{SQRT}\left(\sum_{k=0}^{N-1}p2(t-k)^2\right)\right\}\right\}}$$

wherein:
  N=number of samplings during a calculation period to calculate the correlation coefficient
  k=index of summation
  p1=yaw acceleration at time t
  p2=lateral acceleration at time t
  SQRT=square root.

5. The method according to claim 4 wherein step E further comprises determining whether the correlation coefficient is less than the threshold value for at least a predetermined time period.

6. The method according to claim 1 wherein the calculation of step D comprises calculating a correlation coefficient indicating the magnitude of the phase shift by the formula:

$$\frac{\left\{(1/N)\sum_{k=0}^{N-1} p1(t-k) \cdot p2(t-k)\right\}}{\left\{(1/N)\sum_{k=0}^{N-1} \text{Abs}(p1(t-k)) \cdot \text{Abs}(p2(t-k))\right\}}$$

wherein:
N=number of samplings during a calculation period to calculate the correlation coefficient
k=index of summation
p1=yaw acceleration at time t
p2=lateral acceleration at time t.

7. The method according to claim 6 wherein step E further comprises determining whether the correlation coefficient is less than the threshold value for at least a predetermined time period.

8. The method according to claim 1 further including, if vehicle sway is determined, the step of applying independent braking forces to each wheel of the vehicle to create a yaw movement of opposite phase to the vehicle sway.

9. The method according to claim 8, further including, if vehicle sway is determined, reducing a torque of the engine.

10. The method according to claim 1 further including, if vehicle sway is determined, reducing a torque of the engine.

11. The method according to claim 1, further comprising:
F. determining whether vehicle speed is greater than a predetermined value;
G. determining whether a number of yaw rate oscillations is greater than a predetermined value;
H. determining whether a number of lateral acceleration oscillations is greater than a predetermined value;
I. determining that vehicle sway is occurring if the predetermined values of steps D and F, respectively, are exceeded.

12. A vehicle, comprising:
an engine;
a plurality of wheels;
a braking system configured to apply independent braking forces to each wheel;
sensors which sense yaw acceleration and lateral acceleration of the vehicle while moving to provide a yaw acceleration signal and a lateral acceleration signal; and
a controller operably connected to the engine and the braking system and configured to:
determine whether there is a phase shift of the yaw acceleration signal relative to the lateral acceleration signal;
calculate the magnitude of a phase shift which is determined;
compare the magnitude of the phase shift with a threshold value to determine whether the vehicle is undergoing sway; and
if the vehicle is undergoing sway, perform at least one of: reducing a torque of the engine and applying a braking force independently to each wheel.

13. A non-transitory tangible computer readable medium which stores a control program for determining whether vehicle sway exists and effecting a control to reduce the vehicle sway in a vehicle which includes an engine, a plurality of wheels, sensors which sense yaw acceleration and lateral acceleration of the vehicle while moving to provide a yaw acceleration signal and a lateral acceleration signal; the control program enabling a computer to execute a control comprising:
determining whether there exists a phase shift of the yaw acceleration signal relative to the lateral acceleration signal;
calculating, when a phase shift is determined to exist, a magnitude of the phase shift;
determining if the vehicle is undergoing sway by comparing the magnitude of the phase shift with a threshold value; and
reducing a torque of the engine and/or applying a braking force independently to one or more of the wheels by the brake system when it is determined that the vehicle is undergoing sway.

14. The method according to claim 1 wherein the phase shift exists during vehicle sway so that a direction of lateral force produced by lateral acceleration acts on the vehicle is opposite to a direction of a moment produced by yaw acceleration acts on the vehicle.

* * * * *

UNITED STATES PATENT AND TRADEMARK OFFICE
CERTIFICATE OF CORRECTION

PATENT NO. : 8,700,282 B2
APPLICATION NO. : 13/192927
DATED : April 15, 2014
INVENTOR(S) : Akitaka Nishio et al.

It is certified that error appears in the above-identified patent and that said Letters Patent is hereby corrected as shown below:

Title Page, item (73) Assignee change "Advics Co., Ltd., Kariya-Shi, Aichi-Ken (JP)" to
-- Advics Co., Ltd., Kariya-Shi, Aichi-Ken (JP) & Toyota Jidosha Kabushiki Kaisha, Toyota-Shi, Aichi-Ken (JP) --.

Signed and Sealed this
Twelfth Day of April, 2016

Michelle K. Lee
*Director of the United States Patent and Trademark Office*